No. 863,328. PATENTED AUG. 13, 1907.
G. G. SMITH.
AXLE.
APPLICATION FILED MAY 25, 1906.
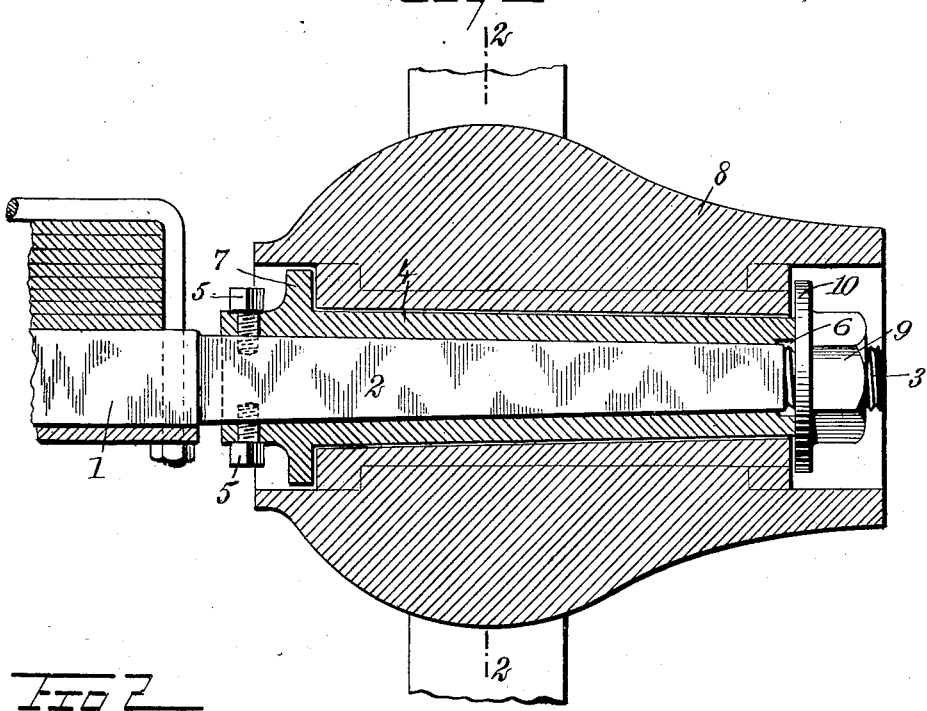
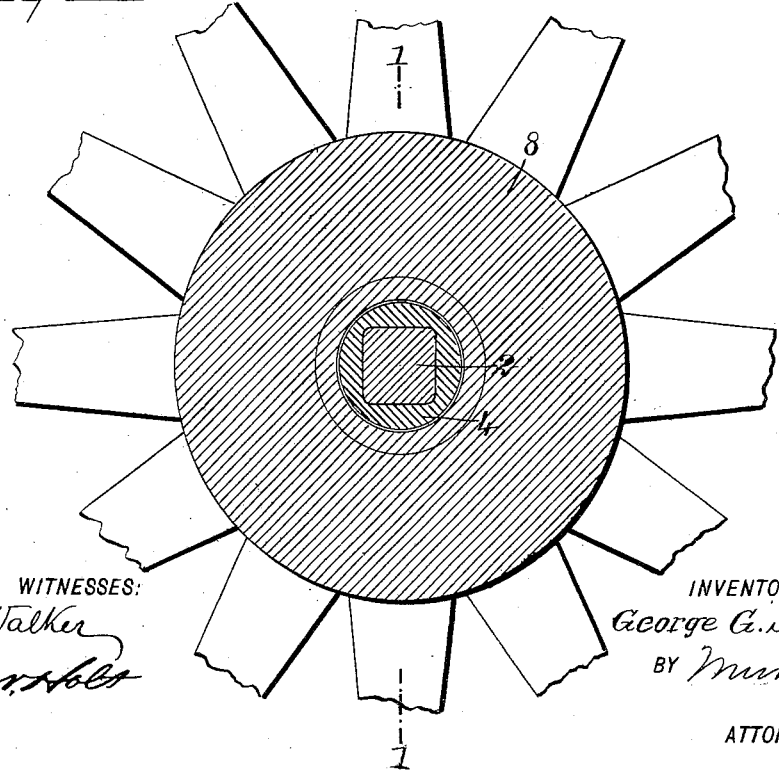
WITNESSES:
H. Walker
INVENTOR
George G. Smith
BY Munn & Co
ATTORNEYS

UNITED STATES PATENT OFFICE.

GEORGE GARRET SMITH, OF BINGHAMTON, NEW YORK.

AXLE.

No. 863,328.      Specification of Letters Patent.      Patented Aug. 13, 1907.

Application filed May 25, 1906. Serial No. 318,658.

*To all whom it may concern:*

Be it known that I, GEORGE GARRET SMITH, a citizen of the United States, and a resident of Binghamton, in the county of Broome and State of New York, have invented a new and Improved Vehicle-Axle, of which the following is a full, clear, and exact description.

This invention is an improvement in vehicle axles designed to overcome the disadvantages in the common form of axle as now in use.

It is well known in road vehicle axles as commonly constructed, that after they have become worn it is necessary that they be either trued up and a new wheel hub provided, or the whole axle tree has to be discarded and a new one substituted in its place.

This invention has for its object to overcome these objectionable features, by forming the spindle of the axle angular in cross section preferably tapering, and covering it with a removable, cylindrical thimble which may be replaced when it becomes loose from wear.

Reference is to be had to the accompanying drawings forming a part of this specification, in which similar characters of reference indicate corresponding parts in all the figures.

Figure 1 is a central section through the hub of a wheel applied to my improved axle, said section being taken on the line 1—1 of Fig. 2, and Fig. 2 is a transverse, vertical section through the hub, on the line 2—2 of Fig. 1.

Referring to the drawing figures, the numeral 1 indicates an ordinary form of axle tree, which is usually square in cross section, and has projecting from it an axle spindle 2. This spindle 2 is also square in cross section and tapers from the axle tree outwardly, being smaller at its outer end where a thread 3 is provided. A thimble 4, through which a square aperture or bore passes, having a taper of the same pitch as the spindle 2, is driven upon and positively fastened to the spindle by set bolts 5 passing transversely through it adjacent to the axle tree. The thimble is counterbored, as shown at 6, at its outer end in order that danger of marring the threads will be eliminated. The thimble is of cylindrical formation of a corresponding outer taper to its bore, and is provided at its end adjacent to the set bolts 5 with an enlargement 7 forming a shoulder to limit the inward movement of the hub 8. A nut 9 is screwed upon the threaded end 3 of the spindle and has an enlarged washer base 10 bearing on the thimble and holding the hub of the wheel from longitudinal outward displacement. The thimble 4 is applied by pressing or driving it on the axle as above indicated, which, when the bore is of the proper size, should become tightly engaged when its outer end is a short distance from the inner ends of the thread 3. The set bolts 5 are then tightly pulled up by a wrench, which insures positive engagement of the bushing with the spindle. After the thimble has become worn, instead of truing the spindle and supplying the wheel with a new hub to fit it, or providing a new axle tree as is usual, it is only necessary to remove the old thimble and substitute a new one in its place.

Having thus described my invention I claim as new and desire to secure by Letters Patent:

1. The combination of an axle tree having a tapered spindle extending therefrom square in cross section, a thread upon the outer end of the spindle, a cylindrical tapered thimble having a bore to fit the spindle, said bore being counterbored adjacent to the threaded end of the spindle, set bolts for securing the bushing to the spindle, an enlargement about the thimble adjacent to the set bolts to limit the inward movement of the hub, and a nut screwed upon the threaded end of the spindle and pressing on the thimble, as described.

2. The combination of an axle-tree having an angular spindle extending therefrom of uniform taper, with a threaded outer end, and a thimble having a bore passing entirely through it of corresponding taper to closely fit the spindle, said bore adjacent to the threaded end of the spindle being counterbored for the purpose described.

In testimony whereof I have signed my name to this specification in the presence of two subscribing witnesses.

GEORGE GARRET SMITH.

Witnesses:
     HERBERT I. WALKER,
     FRANK STEWART.